E. Hitchcock,
Churn.
No. 91,016.      Patented June 8, 1869.
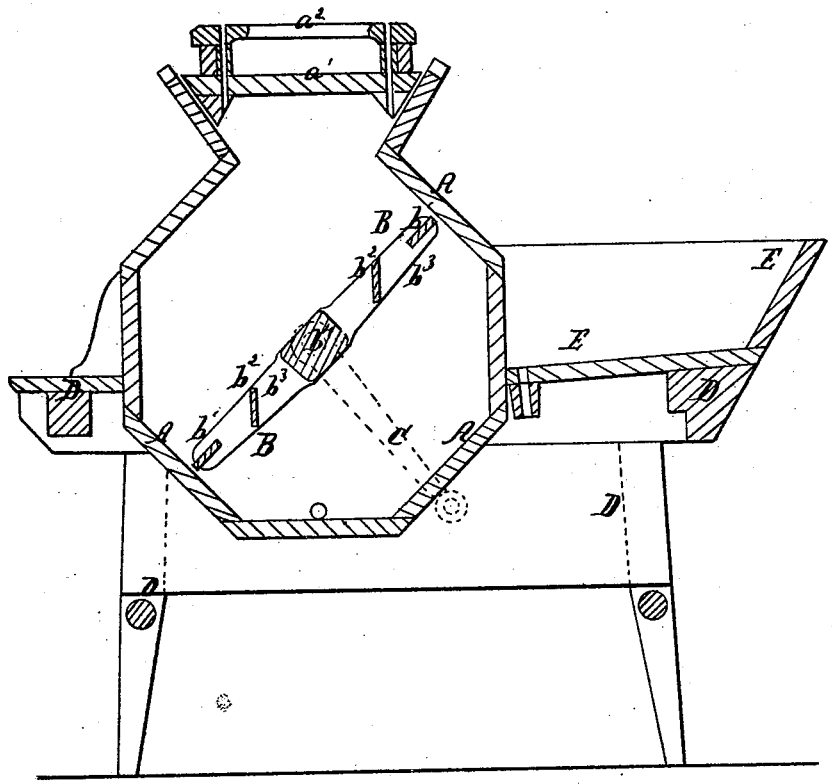
Witnesses
Chas. Nida
John H. Brooks
Inventor
Eaton Hitchcock
per Munn & Co.
Attorneys

United States Patent Office.

EATON HITCHCOCK, OF STURBRIDGE, MASSACHUSETTS.

Letters Patent No. 91,016, dated June 8, 1869.

IMPROVEMENT IN CHURNS.

The Schedule referred to in these Letters Patent and making part of the same.

*To all whom it may concern:*

Be it known that I, EATON HITCHCOCK, of Sturbridge, in the county of Worcester, and State of Massachusetts, have invented a new and useful Improvement in Churn and Butter-Sink; and I do hereby declare that the following is a full, clear, and exact description thereof, which will enable others skilled in the art to make and use the same, reference being had to the accompanying drawing, forming part of this specification.

The figure is a longitudinal section of my improved churn and butter-sink.

My invention has for its object to furnish a simple machine, by the use of which the labor attending the making of butter may be greatly diminished, by uniting in one machine the apparatus for churning and working the butter; and It consists in the arrangement of parts as will be hereinafter described.

A is the body of the churn, which is made in the form of an octagonal cylinder, the mouth or opening being formed in the upper side.

The mouth of the churn A is formed with a hopper-shaped, upwardly-projecting flange, into which the lid $a^1$ fits.

The lid $a^1$ is provided with ventilating-tubes or holes passing down through the ears of the handle $a^2$, to prevent the cream from spattering out while the churning is being done.

The churning is done by the dasher B, which is formed by attaching longitudinal slats, $b^1$ and $b^2$, to the cross-bars $b^3$, the middle parts of which are secured to the dasher-shaft $b^4$.

The journals of the shaft $b^4$ work in water-tight bearings in the ends of the churn-body A, and to the projecting end of one of said journals is attached the crank C, by means of which the dasher is operated.

The longitudinal slats $b^2$ are attached to the bars or arms $b^3$, in an inclined position, and the slats $b^1$, in such a position as to be in the same plane as the bars $b^3$, as shown in the figure.

The churn-body A is securely and permanently attached to a table or frame-work, D, of convenient height.

To the table or frame D, at one side of the churn A, and close to it, is attached a sink, E, of a size proportioned to the capacity of the churn.

I make the sink slightly hopper-shaped, and with its bottom slightly inclined, so that as the milk is worked from the butter, the milk may flow off through an opening in the lower part of said bottom, into a pail or other receptacle placed beneath.

By this construction, when the churning is completed, the butter is removed from the churn A, and placed in the sink E, the drip falling upon the inclined side of the churn, or an inclined apron attached to said churn, and flowing into the sink E, where the butter is worked.

The liquid contents of the churn may be drawn off through an opening in or near its bottom.

Having thus described my invention,

What I claim as new, and desire to secure by Letters Patent, is—

The arrangement of the butter-sink E, and table D, with reference to the churn-body A, as and for the purpose specified.

EATON HITCHCOCK.

Witnesses:
CALEB NICHOLS,
HENRY E. HITCHCOCK.